March 18, 1930.  F. W. KOCH  1,750,671
ALLOY BLOCK FOR SOLDERING
Filed Nov. 20, 1928
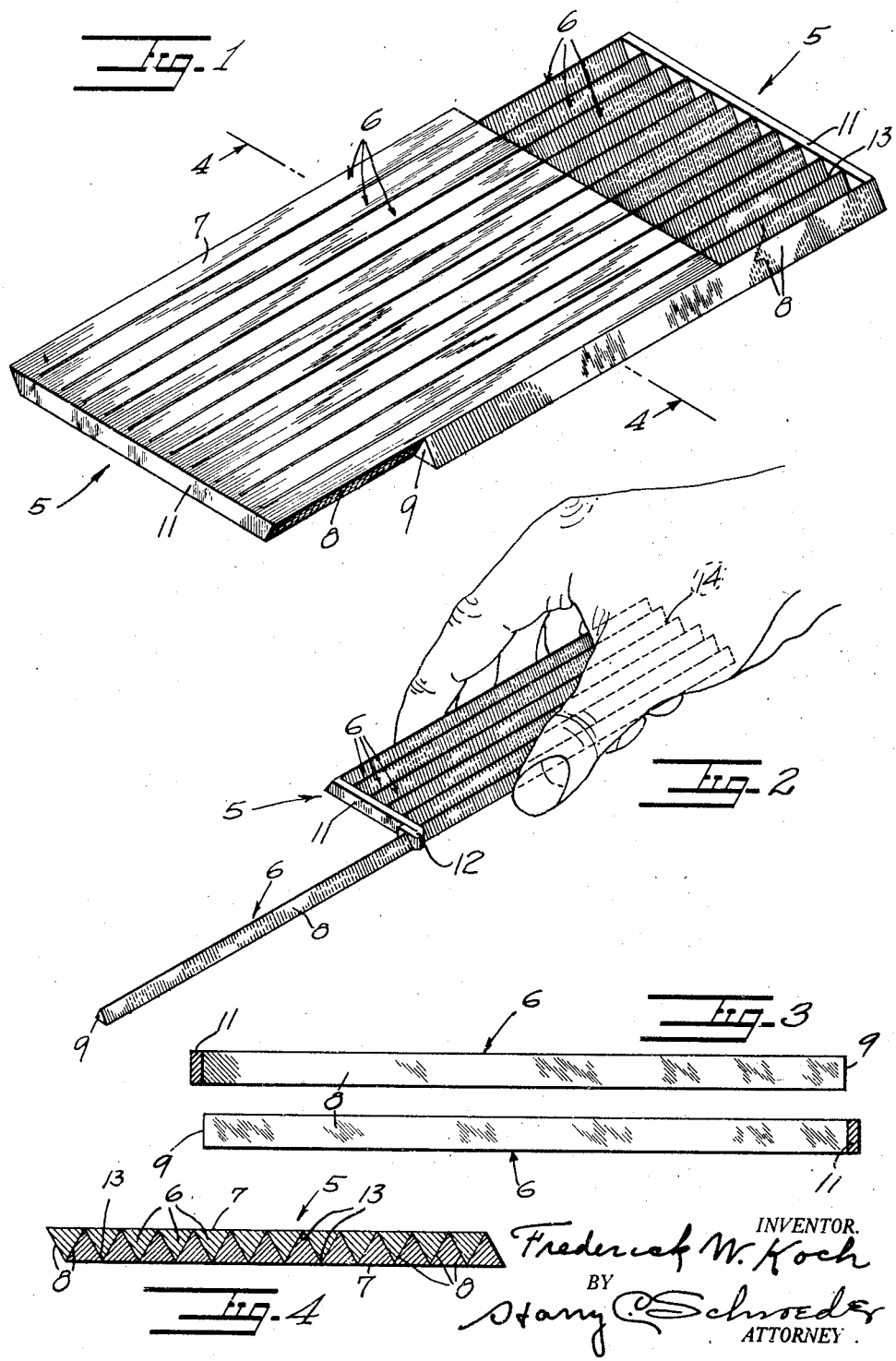

Patented Mar. 18, 1930

1,750,671

UNITED STATES PATENT OFFICE

FREDERICK W. KOCH, OF OAKLAND, CALIFORNIA

ALLOY BLOCK FOR SOLDERING

Application filed November 20, 1928. Serial No. 320,594.

The invention forming the subject matter of this application relates to fusible alloy bars used for soldering.

The fusible alloy or solder by which joints are formed between metallic surfaces, was heretofore made in individual bars or strips of wire usually bent into the shape of a spiral coil. Frequently the end pieces of the solder were entirely wasted, othertimes the end piece of the solder, too short to be held by hand, was fused to the end of a new coil, and was thus utilized.

The primary object of the present invention is the provision of a solder block formed by a plurality of bars fused to each other at one end thereof, whereby the bending of an individual bar around the fused end thereof is readily attainable; the fused end holding the bar in position on the block after the bar is turned into operative position, so that the remaining bars of the block are utilized as a handle, thereby allowing the melting of the entire bar, to its fused end.

Another object of the invention is the provision of a solder block formed by a plurality of bars fused to each other at an end thereof, the other ends of the bars being free; each of said bars having three rectangular plane faces or sides and two equal and parallel triangular ends, the bars being positioned side by side so that the base faces of the triangular bars are in alignment with each other, the other faces of the adjacent bars forming V shaped nests or troughs into which the triangular bars of another block may be inserted for the purposes of packing and ready transportation.

A further object of the invention is the provision of blocks of solder, each block formed by a plurality of triangular bars fused to each other at an end thereof, so that each bar is adapted to be bent around the fused end thereof; the plane base faces of the bars forming a substantially continuous, plane surface on one side of the block, while the angular sides of the adjacent bars form a plurality of nests or V shaped troughs on the other face or side of the block into which the triangular bars of another block are inserted so that the package thus formed presents smooth outer surfaces on each side thereof; lateral slipping of the blocks relatively to each other, after packed, is also entirely obviated.

Other objects of the invention are to provide solder blocks of the character described that will be superior in point of simplicity, inexpensiveness of construction, positiveness of operation and facility and convenience in use and general efficiency.

In this specification, and the annexed drawings the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawings, in which:

Figure 1 is a perspective view of two complemental solder blocks in overlapping position, one resting upon the other.

Figure 2 is a perspective view of a solder block, showing one of the bars turned into fusing position, and illustrating the employment of the unused bars of the block as a handle.

Figure 3 is a longitudinal, sectional view of the complemental blocks, showing the same spaced above each other in aligning position, And Figure 4 is a cross section of the two blocks, the section being taken on the line 4—4 of Figure 1.

Referring to the accompanying drawings wherein similar reference characters designate similar parts throughout, the various figures described above adequately illustrate my invention, and the following detailed description is commensurate with the above mentioned drawings in enabling an artisan to construct and assemble the constituent parts of the same.

In carrying out my invention I form solder blocks 5, preferably by casting. The blocks are similar in form. Each block comprises a plurality of solder bars 6. Each bar 6 is cast in the shape of a solid, triangular prism having a rectangular plane base 7, rectangular plane sides 8, and a triangular end face 9 at a free end thereof. The other ends of the bars 6 are cast integral with each other so as to form a solid transverse end member 11.

Inasmuch as the end member 11 is of the same composition as the alloy from which the bars 6 are made and as the end member 11 is slightly thinner at the joints between the adjacent bars, the end member 11 is bent with ease around said joints denoted by the numeral 12. Thus a bar 6 can be readily separated at the free end thereof from the remaining bars, and turned around the joints 12, causing the doubling of the end member thereat, as shown in Figure 2. By turning the bar 6, around the joint 12, to 180° from its original parallel position, an individual solder bar is formed, protruding full length beyond the end member 11 in opposite direction to the remaining bars of the block 5.

The unbent bars 6 are used as a handle until the separated or bent bar 6 is entirely consumed to its cast or fused end at the joint 12. Such use of the block 5 is illustrated in Figure 2. Thus one bar after the other is turned from its original parallel position, and used for soldering, until the entire block is melted away in fusing operations.

The bars may be made of any cross section such as rectangular or polygonal. However the aforedescribed triangular shape is preferable because it allows the interlocking of two adjacent blocks. In order to achieve this interlocking the bars 6 are disposed side by side so that the base planes 7 thereof are in alignment with each other forming a smooth substantially continuous surface. The angular, plane sides 8 of the bars 6, when the bars 6 are positioned side by side, include V shaped troughs 13, the free ends 14 of which are open, while the other ends thereof are terminated by the joining portion 12 of the end member 11. Consequently when two blocks are placed one upon the other, with their angular faces toward each other, the angular sides of the bars 6 of one block are slidably resting in the V shaped troughs 13 formed between the bars 6 of the other block 5. It is apparent that one block may be inserted endwise relatively to the open end of the other, the longitudinal movement of the free ends thereof being limited by the respective end members 11.

It will be recognized that the solder block made in the manner heretofore described provides a length of solder bars, without necessitating the making of the bar in a single, long strip. The length of solder provided by such a block, having twelve bars 6 thereon, is in effect equivalent to a single strip of solder, twelve times the length of the block 5; and this object is accomplished without the cumbersome bending or coiling of a long strip of solder bar or wire into a transportable unit.

It will be also noted that the solder block is also used as a handle to one of the bars which is bent away from the remaining bars. The waste of the end piece of a solder bar or wire is entirely obviated. The alloy from which the block is made is cast in a mold of desired shape, so as to produce a unitary block, the bars on which are slightly spaced from each other and are integral with an end member for joining an end of the bars or the end member may be formed by the joined ends of the bars. The bending of a single bar away from its parallel position with the others and into operative position may be readily performed by the average layman.

Having thus described my invention what I now claim as novel and desire to secure by Letters Patent is:

1. A set of solder bars disposed in parallel, spaced position, alongside each other and joined at an end thereof so as to allow the bending of each bar at its joint; each bar being of triangular cross section, the bases of the triangular bars being in alignment with each other to form a substantially continuous surface, the remaining sides of the adjacent trangular bars defining longitudinal troughs between the bars for receiving a complemental set of bars therein.

2. A set of solder bars disposed in parallel, spaced position, alongside each other and joined at an end thereof so as to allow the bending of each bar at and around its joint in the plane of the set; each bar being of triangular cross section the bases of the triangular bars being in alignment with each other to form a substantially continuous surface, the remaining sides of the adjacent triangular bars defining longitudinal troughs between the bars for receiving a complemental set of bars therein.

3. An article of manufacture comprising a plurality of solder bars, and a pliant transverse supporting member for supporting an end of each bar, said member supporting said bars in parallel, spaced relation to each other so as to allow the bending of the pliant member by turning of one of the bars away from the remaining bars but in the plane thereof; each bar being of triangular cross section, the bases of the triangular bars being in alignment with each other to form a substantially continuous surface, the remaining sides of the adjacent triangular bars defining longitudinal troughs between the bars for receiving a complemental set of bars therein.

4. An article of manufacture comprising a plurality of solder bars, and a pliant, transverse supporting member for supporting an end of each bar, said member supporting said bars in parallel, spaced relation to each other so as to allow the bending of the pliant member by the turning of one of the bars away from the remaining bars but in the plane thereof; each bar being of triangular cross section; the bases of the triangular bars being in alignment with each other to form a substantially continuous surface, the remaining sides of the bar forming V shaped troughs between the adjacent bars for receiving a complemental set of bars therein.

5. A pair of complementary blocks of solder each comprising a plurality of bars triangular in cross section and united at one of their ends by a pliable strip.

6. A pair of complementary blocks of solder each comprising a plurality of bars triangular in cross section and in parallel relation, said bars being separable from each other at their base line and united at one end of the block by a pliable strip.

7. A pair of complementary blocks of solder each comprising a plurality of bars triangular in cross section and forming a substantial continuous surface at their base line, said bars being united by a transverse bar at one end of the block.

8. A pair of blocks of solder each comprising a plurality of bars so shaped as to form a plurality of troughs for the reception therein of the complementary bars of the other of the blocks in nested relation, said bars of each pair being united by a transverse bar at one end of the blocks.

In testimony whereof I have affixed my signature.

FREDERICK W. KOCH.